United States Patent
Katayama (10) Patent No.: US 11,698,013 B1
(45) Date of Patent: Jul. 11, 2023

(54) ENGINE CONTROLLER AND METHOD FOR CONTROLLING ENGINE

(71) Applicant: TOYOTA JIDOSHA KABUSHIKI KAISHA, Toyota (JP)

(72) Inventor: Akihiro Katayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/065,749

(22) Filed: Dec. 14, 2022

(30) Foreign Application Priority Data

Dec. 20, 2021 (JP) .................................. 2021-206381

(51) Int. Cl.
*F01N 3/20* (2006.01)
*F01N 3/28* (2006.01)

(52) U.S. Cl.
CPC ......... *F01N 3/2053* (2013.01); *F01N 3/2006* (2013.01); *F01N 3/2892* (2013.01); F01N 2240/20 (2013.01); F01N 2340/06 (2013.01); F01N 2390/00 (2013.01)

(58) Field of Classification Search
CPC .... F01N 3/2053; F01N 3/2006; F01N 3/2892; F01N 2240/20; F01N 2340/06; F01N 2390/00; F02D 2013/0292
See application file for complete search history.

(56) References Cited

U.S. PATENT DOCUMENTS

| | | | | |
|---|---|---|---|---|
| 8,516,814 | B2 * | 8/2013 | Okada | F01N 13/009 60/602 |
| 2014/0165555 | A1 * | 6/2014 | Marques | F02B 37/183 60/602 |
| 2014/0325983 | A1 * | 11/2014 | Tsunooka | F02D 41/0007 60/602 |
| 2017/0145936 | A1 * | 5/2017 | Kimura | F02D 41/123 |
| 2018/0245507 | A1 * | 8/2018 | Kitaura | F02B 37/183 |
| 2018/0258817 | A1 | 9/2018 | Kosuge et al. | |

FOREIGN PATENT DOCUMENTS

| | | | | |
|---|---|---|---|---|
| DE | 102017218837 A1 | * | 4/2019 | ........... F01N 13/001 |
| JP | 2003254051 A | * | 9/2003 | ........... F01N 3/2006 |
| JP | 6375808 B2 | * | 8/2018 | ........... F01N 13/017 |
| JP | 2018-145914 A | | 9/2018 | |

* cited by examiner

*Primary Examiner* — Grant Moubry
(74) *Attorney, Agent, or Firm* — Oblon, McClelland, Maier & Neustadt, L.L.P.

(57) ABSTRACT

An engine controller includes processing circuitry configured to execute catalyst accelerated activation control by performing a first process that maintains an open degree of a wastegate valve at a specified first open degree and then performing a second process that changes the open degree of the wastegate valve to an open degree that differs from the first open degree.

8 Claims, 4 Drawing Sheets

ENGINE CONTROLLER AND METHOD FOR CONTROLLING ENGINE

BACKGROUND

1. Field

The following description relates to an engine controller for an engine equipped with a turbocharger. The following description also relates to a method for controlling an engine.

2. Description of Related Art

A turbocharger includes a bypass passage, through which exhaust gas bypassing a turbine flows, and a wastegate valve that opens and closes the bypass passage. Japanese Laid-Open Patent Publication No. 2018-145914 describes an engine controller for an engine equipped with a turbocharger including a bypass passage and a wastegate valve. The engine controller described in the publication executes catalyst accelerated activation control that accelerates activation of a catalyst device by opening the wastegate valve when the engine is started in a cold state. When the wastegate valve opens, the exhaust gas blown into the catalyst device concentrates at a certain portion in the catalyst device. This portion of the catalyst is activated more quickly than when the exhaust gas is blown uniformly into the entire catalyst device. In this manner, the catalyst accelerated activation control is executed to accelerate exhaust gas purification of the catalyst device.

When the catalyst accelerated activation control is completed, the catalyst device is only partially activated. Thus, when an accelerator pedal is depressed immediately after the catalyst accelerated activation control is completed such that a large amount of exhaust enters the catalyst device, most of the exhaust gas may be released into the atmosphere without being purified.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an engine controller applied to an engine is provided. The engine includes a turbine arranged in an exhaust passage, a bypass passage branched from the exhaust passage at an upstream side of the turbine in the exhaust passage and joined with the exhaust passage at a downstream side of the turbine in the exhaust passage, a wastegate valve arranged at a joining location of the bypass passage and the exhaust passage, and a catalyst device for purifying exhaust gas arranged at a downstream side of the joining location in the exhaust passage. The engine controller is configured to execute a catalyst accelerated activation control that maintains the wastegate valve in an open state and accelerates activation of the catalyst device when the engine is started in a cold state. The engine controller includes processing circuitry configured to execute the catalyst accelerated activation control by performing a first process that maintains an open degree of the wastegate valve at a specified first open degree and then performing a second process that changes the open degree of the wastegate valve to an open degree that differs from the first open degree.

In another general aspect, a method for controlling an engine is provided. The engine includes a wastegate valve configured to open a bypass passage that bypasses a turbine arranged in an exhaust passage, and a catalyst device for purifying exhaust gas arranged at a downstream side of the wastegate valve in the exhaust passage. The method includes performing a first process that maintains an open degree of the wastegate valve at a specified first open degree so that exhaust gas is blown over a first region in the catalyst device when the engine is started in a cold state; and performing a second process that maintains the open degree of the wastegate valve at a second open degree that differs from the first open degree so that the exhaust gas is blown over a second region in the catalyst device that differs from the first region after the first process is performed.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

An engine controller according to a first embodiment will now be described in detail with reference to the drawings.

Configuration of Engine Controller

Figure 1:
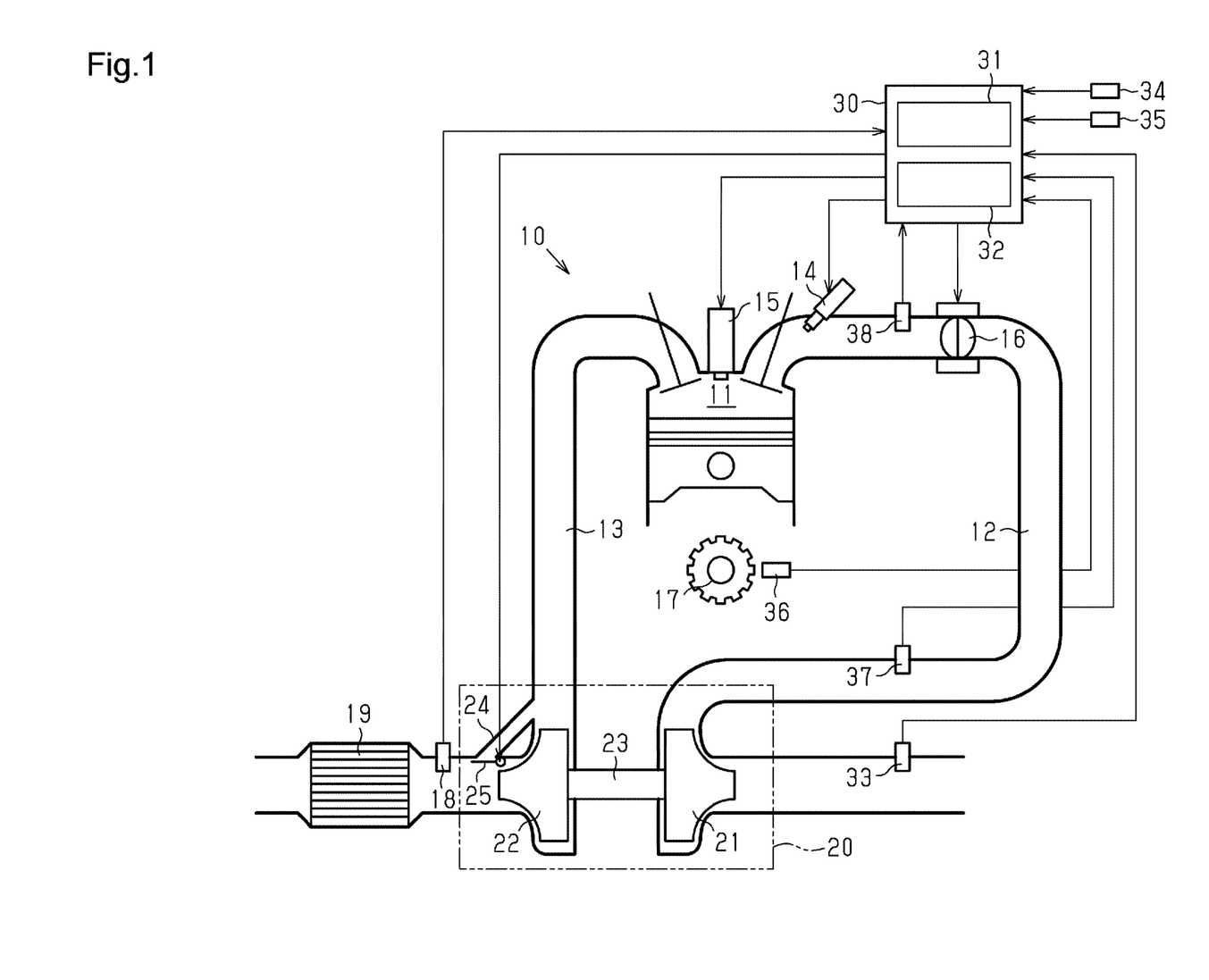
FIG. 1 is a schematic diagram illustrating an engine controller according to a first embodiment.

The configuration an engine controller according to the present embodiment will now be described with reference to FIG. 1. An engine 10 controlled by the engine controller of the present embodiment includes a combustion chamber 11 in which an air-fuel mixture is burned. The engine 10 also includes an intake passage 12, through which intake air is drawn into the combustion chamber 11, and an exhaust passage 13, through which exhaust gas is discharged from the combustion chamber 11. The engine 10 also includes an injector 14 that injects fuel into the intake air to form an air-fuel mixture and an ignition device 15 that ignites the air-fuel mixture inside the combustion chamber 11 with a spark discharge. The intake passage 12 includes a compressor 21 and a throttle valve 16 arranged at the downstream side of the compressor 21. The open degree of the throttle valve 16 is changed to adjust the amount of intake air drawn into the combustion chamber 11. The engine 10 burns the air-fuel mixture inside the combustion chamber 11 to rotate a crankshaft 17 and generate driving force of the vehicle.

The engine 10 includes a turbocharger 20. The turbocharger 20 includes the compressor 21, which is arranged in the intake passage 12, and a turbine 22, which is arranged in the exhaust passage 13. The compressor 21 is an impeller that rotates to compress the intake air. The turbine 22 is an impeller that is rotated by the flow of exhaust gas. The compressor 21 is connected to the turbine 22 by a turbine shaft 23. Thus, the compressor 21 is rotated in cooperation with the rotation of the turbine 22. Further, the exhaust passage 13 includes a bypass passage 24 through which exhaust gas bypassing the turbine 22 flows. The bypass passage 24 is branched from the exhaust passage 13 at the upstream side of the turbine 22 in the exhaust passage 13 and then joined with the exhaust passage 13 at the downstream side of the turbine 22. A wastegate valve (WGV) 25 that opens and closes the bypass passage 24 is arranged at a location where the bypass passage 24 is joined with the exhaust passage 13. The WGV 25 is configured to open the bypass passage 24, which bypasses the turbine 22 arranged in the exhaust passage 13.

The exhaust passage 13 includes an air-fuel ratio sensor 18 that detects the air-fuel ratio of the air-fuel mixture that was burned in the combustion chamber 11. The air-fuel ratio sensor 18 is arranged at the downstream side of the turbine 22 and the downstream side of the location where the bypass passage 24 is joined with the exhaust passage 13. The exhaust passage 13 also includes a catalyst device 19 that carries a catalyst used to purify exhaust gas such as a three-way catalyst. The catalyst device 19 is arranged at the downstream side of the air-fuel ratio sensor 18 in the exhaust passage 13.

The engine 10 is controlled by an engine control module (ECM) 30 serving as an engine controller. The ECM 30 includes a processor 31 and a memory 32. The memory 32 stores engine control programs and data. The processor 31 controls the engine 10 by reading the program from the memory 32 and executing the program. The ECM 30 receives detection results from various sensors that detect the operation state of the engine 10. In addition to the air-fuel ratio sensor 18, the sensors that send detection results to the ECM 30 include an air flowmeter 33, an intake air temperature sensor 34, a coolant temperature sensor 35, a crank angle sensor 36, a charging pressure sensor 37, and an intake manifold pressure sensor 38. The air flowmeter 33 detects the intake air flow rate GA of the intake air flowing through the intake passage 12. The intake air temperature sensor 34 detects the intake air temperature THA of the intake air drawn into the intake passage 12. The coolant temperature sensor 35 detects the engine coolant temperature THW of the coolant in the engine 10. The crank angle sensor 36 detects the crank angle CRNK, which is the rotation angle of the crankshaft 17. The charging pressure sensor 37 detects the charging pressure PB, which is the pressure of the intake air at the downstream side of the compressor 21 and the upstream side of the throttle valve 16 in the intake passage 12. The intake manifold pressure sensor 38 detects the intake manifold pressure PM, which is the pressure of the intake air at the downstream side of the throttle valve 16 in the intake passage 12. The ECM 30 controls the amount and timing fuel is injected from the injector 14, the timing at which the ignition device 15 ignites the air-fuel mixture, the throttle open degree, the WGV open degree, and the like based on the detection results of the sensors.

Catalyst Accelerated Activation Control

The ECM 30 executes catalyst accelerated activation control that opens the WGV 25 and accelerates activation of the catalyst device 19 when the engine 10 is started in a cold state. The catalyst accelerated activation control accelerates activation of the catalyst device 19 in the following manner. The ECM 30 closes the WGV 25 when the engine 10 is stopped. Thus, when the engine 10 is started, the WGV 25 is closed.

When the WGV 25 is closed, exhaust gas flows through the turbine 22. The flow of exhaust gas is swirled when passing through the turbine 22. Thus, the turbine 22 spreads the passing exhaust gas over a wide range. Accordingly, when the WGV 25 is closed, the exhaust gas is blown over a wide range in the front end of the catalyst device 19. The front end is the end surface at the upstream side of the catalyst device 19 with respect to the direction in which exhaust gas flows.

When the WGV 25 opens, a large amount of exhaust gas flows through the bypass passage 24. This result in the exhaust gas flowing out of the bypass passage 24 producing a jet flow. Accordingly, when the WGV 25 opens, exhaust gas is blown against part of the front end of the catalyst device 19 in a concentrated manner. In other words, the exhaust gas heats part of the catalyst device 19 in a concentrated manner. As a result, the catalyst in the catalyst device 19 is partially activated more quickly when the WGV 25 is open than when the WGV 25 is closed. The catalyst accelerated activation control maintains the WGV 25 in an open state to shorten the period during which the catalyst device 19 cannot purify exhaust gas when the engine 10 is started in a cold state.

The definition of the WGV open degree in the present embodiment will now be described. The operational position of the WGV 25 in a state closing the bypass passage 24 corresponds to the WGV open degree of 0. Further, the moved amount of the WGV 25, from the operational position corresponding to the WGV open degree of 0, is the value of the WGV open degree. In the description hereafter, the maximum value of the WGV open degree in the range in which it is controlled is referred to as the fully open degree. A WGV open degree that is greater than 0 and less than the fully open degree is referred to as an intermediate open degree.

Figure 2:
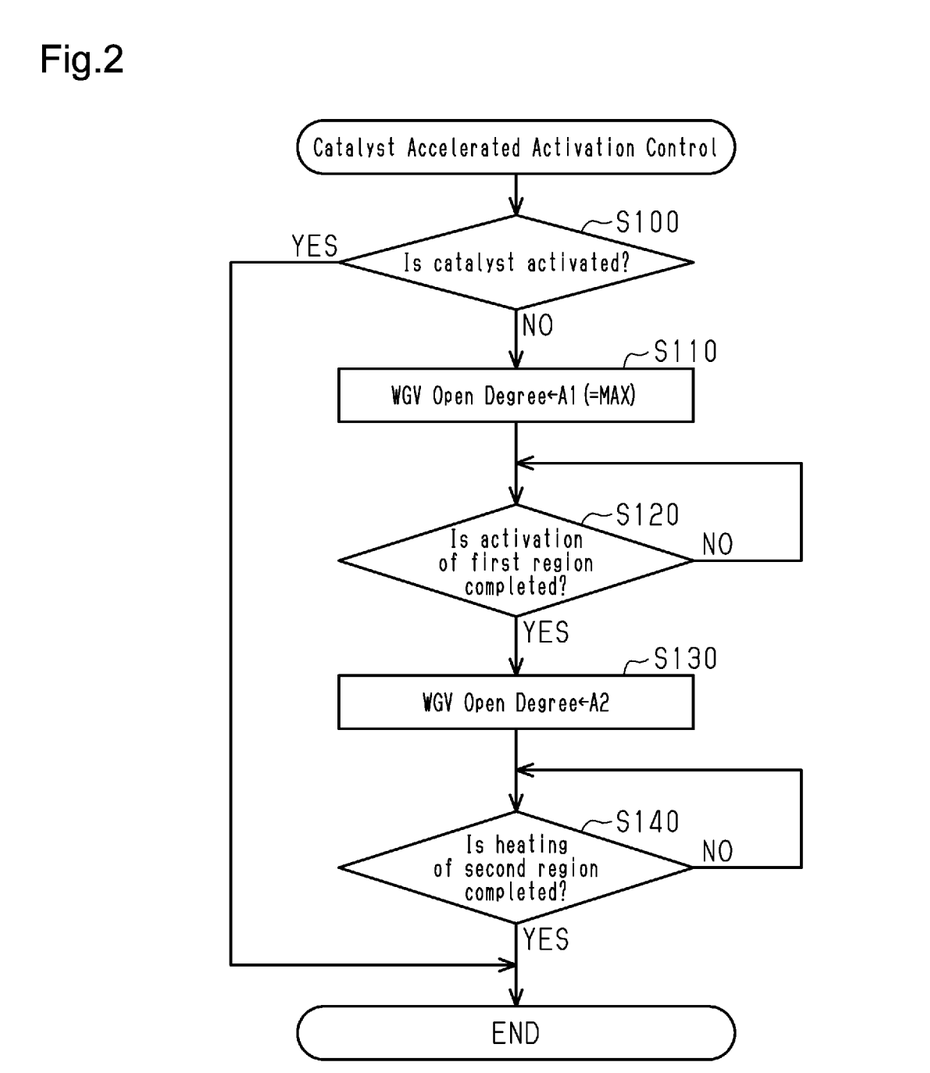
FIG. 2 is a flowchart illustrating the procedures for catalyst accelerated activation control executed by the engine controller.

FIG. 2 shows the procedures for processing a catalyst accelerated activation control routine executed by the ECM 30. The ECM 30 initiates the routine when the engine 10 is started.

When the routine is initiated, in step S100, the ECM 30 determines whether the catalyst device 19 has been activated. In the present embodiment, the determination is made from the intake air temperature THA and the engine coolant temperature THW that are obtained when the engine is started. When determining that the catalyst device 19 has already been activated (S100: YES), the ECM 30 ends the routine for the present starting of the engine 10. After the routine ends, the ECM 30 sets a target charging pressure in accordance with the operational state of the engine 10 and initiates a WGV open degree feedback control so that the charging pressure PB becomes equal to the target charging pressure.

When determining that the catalyst device 19 is not activated (S100: NO), the ECM 30 proceeds to step S110. In step S110, the ECM 30 opens the WGV 25 so that the WGV open degree increases to a specified first open degree A1. In the present embodiment, the fully open degree is the first open degree A1. When the WGV 25 opens, exhaust gas is blown over part of the catalyst device 19 in a concentrated manner. This heats the part of the catalyst device 19 over which the exhaust gas is blown in a concentrated manner. In the following description, the portion in the front end of the catalyst device 19 over which the exhaust gas is blown in a concentrated manner when the WGV open degree is the first open degree A1 will be referred to as the first region R1.

Then, the ECM 30 continues to determine in predetermined control cycles whether the activation of the first region R1 has been completed (S120). Specifically, the ECM 30 determines whether the temperature of the first region R1 has reached the temperature at which a catalyst is activated. The determination is made from the time elapsed from when the WGV 25 opens in step S110. When determining that the first region R1 has been activated (S120: YES), the ECM 30 changes the WGV open degree from the first open degree A1 to a specified second open degree A2 in step S130. In the present embodiment, the second open degree A2 is an intermediate open degree. In the present embodiment, the process from step S110, which is when the WGV 25 starts to open, to step S130 corresponds to a first process.

The WGV open degree is changed to alter the direction in which exhaust gas is blown out of the bypass passage 24. This shifts the portion in the front end of the catalyst device 19 over which exhaust gas is blown in a concentrated manner. Thus, the change in the WGV open degree in step S130 shifts the portion of the catalyst device 19 heated by the exhaust gas. In the following description, the portion in the front end of the catalyst device 19 over which the exhaust gas is blown in a concentrated manner when the WGV open degree is the second open degree A2 will be referred to as the second region R2.

Then, the ECM 30 continues to determine in predetermined control cycles whether the heating of the second region R2 has been completed (S140). The completion of heating in this case refers to a situation where, for example, the temperature of the second region R2 reaches the activation temperature of the catalyst. Even when the temperature of the second region R2 is lower than the activation temperature of the catalyst, the ECM 30 may determine that heating has been completed as long as the temperature rises and becomes close to the activation temperature. The determination is made from the time elapsed from when, for example, the WGV open degree is changed to the second open degree A2 in step S130. When determining that the heating of the second region R2 has been completed (S140: YES), the ECM 30 ends the routine. In the present embodiment, the process from step S130, in which the WGV open degree is changed, to the end of the routine corresponds to a second process.

Operation and Advantages of the Embodiment

The operation and advantages of the present embodiment will now be described. In the present embodiment described above, the catalyst accelerated activation control is executed by performing the first process that maintains the WGV open degree at the first open degree A1 and then performing the second process that changes the WGV open degree to the second open degree A2 that differs from the first open degree A1.

Figure 3:
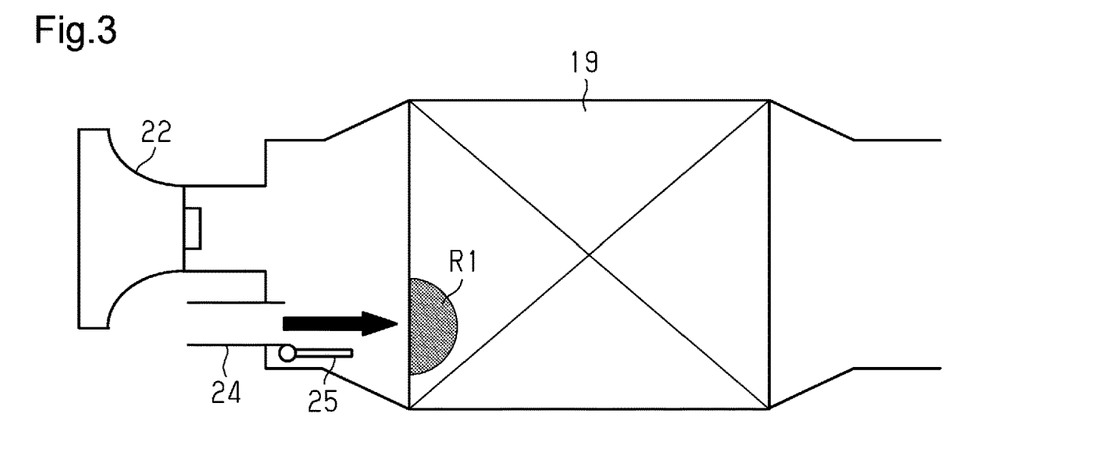
FIG. 3 is a diagram illustrating a catalyst device during a first process in the catalyst accelerated activation control.

FIG. 3 illustrates the catalyst device 19 during the first process. The arrows in FIGS. 3, 4, and 5 indicate the flow of exhaust gas blown into the catalyst device 19. When the WGV 25 opens, a large amount of exhaust gas bypasses the turbine 22 and flows through the bypass passage 24. Thus, the exhaust gas blown over the front end of the catalyst device 19 is concentrated in the first region R1. The first process continues until the catalyst is activated in the first region R1. When activation of the first region R1 is completed, the catalyst device 19 partially becomes capable of purifying the exhaust gas. If the catalyst accelerated activation control were to be finished at this stage in which the first process is completed, the following problem may arise.

Figure 4:
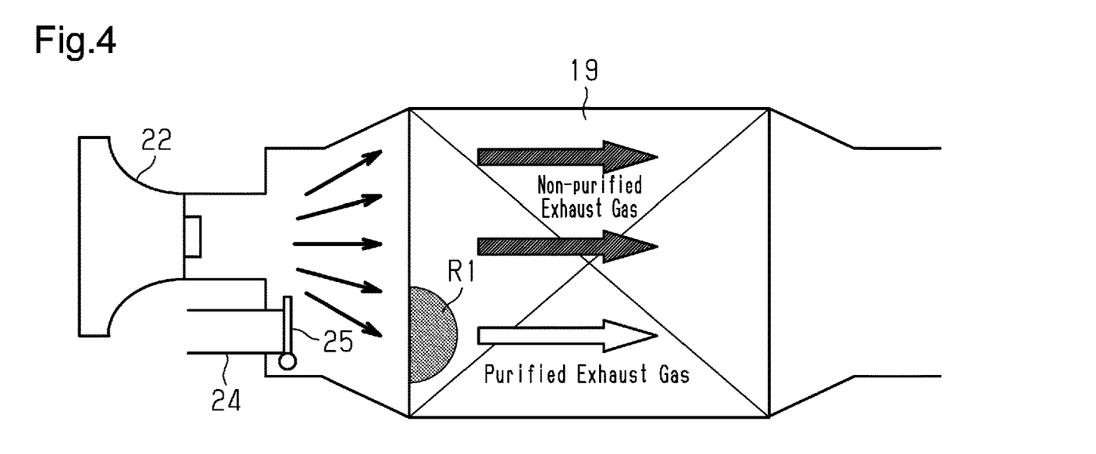
FIG. 4 is a diagram illustrating the catalyst device immediately after the catalyst accelerated activation control ends in a comparative example that ends the catalyst accelerated activation control after the first process is finished.

FIG. 4 illustrates the catalyst device 19 immediately after the catalyst accelerated activation control ends upon completion of the first process in a comparative example. In this case, the catalyst of the catalyst device 19 remains inactivated at portions other than the first region R1. When the WGV 25 closes in this state, exhaust gas flows through inactivated portions of the catalyst in the catalyst device 19. This may result in the engine 10 emitting a large amount of non-purified exhaust gas into the atmosphere ambient air. In contrast with the comparative example, the present embodiment performs the second process after the first process as described above so that the engine 10 does not emit exhaust gas in an undesirable state.

Figure 5:
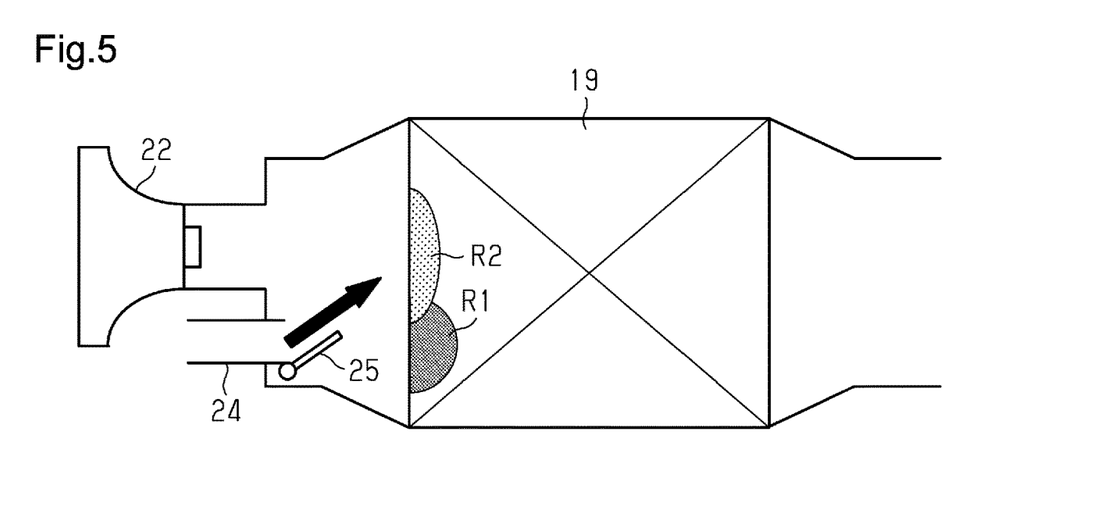
FIG. 5 is a diagram illustrating the catalyst device when a second process is being performed during the catalyst accelerated activation control.

FIG. 5 illustrates the catalyst device 19 during the second process. In the second process, the WGV open degree is changed from the first open degree A1 to the second open degree A2. The change in the WGV open degree alters the direction in which exhaust gas flows from the bypass passage 24 into the catalyst device 19. This shifts the region heated by the exhaust gas from the first region R1 to the second region R2 and raises the temperature of the second region R2. Thus, the heated portion where the catalyst temperature is high is expanded over a wider area than when the catalyst accelerated activation control ends with the fixed WGV open degree. Accordingly, the emission of the engine 10 immediately after the catalyst accelerated activation control ends is improved.

As described above, the second process may continue until activation of the catalyst in the second region R2 is completed or end before activation of the second region R2 is completed. In the latter case, as long as the catalyst temperature of the second region R2 has been raised by a certain extent when the catalyst accelerated activation control ends, the catalyst in the second region R2 will be activated within a short period of time after the catalyst accelerated activation control ends. Thus, the emission of the engine 10 immediately after the catalyst accelerated activation control ends will also be improved in such a case.

The engine controller of the present embodiment has the following advantages.

In the present embodiment, the catalyst accelerated activation control is executed by performing the first process that maintains the WGV open degree at the first open degree A1 and then the second process that changes the WGV open degree to the second open degree A2. The second process expands the region with a high catalyst temperature. This limits deterioration in the exhaust performance of the engine 10 immediately after the catalyst accelerated activation control ends. Accordingly, the engine controller of the present embodiment improves the exhaust performance when the engine 10 is started in a cold state.

Second Embodiment

The engine controller according to a second embodiment will now be described with reference to FIG. 6. In the present embodiment, the same reference numerals are given to those components that are the same as the corresponding components of the above embodiment and detailed description thereof is not described.

The engine controller of the present embodiment executes exhaust gas heating control when executing the catalyst accelerated activation control. The exhaust gas heating control increases the amount of heat of the exhaust gas entering the catalyst device 19. The exhaust gas heating control raises the temperature of the exhaust gas entering the catalyst device 19 by retarding the ignition timing, setting a lean air-fuel ratio, or the like. The exhaust gas heating control also increases the flow rate of the exhaust gas entering the catalyst device 19 by increasing the amount of intake air or the like. The exhaust gas heating control is executed together with the catalyst accelerated activation control to further accelerate the activation of the catalyst device 19.

The exhaust gas entering the catalyst device 19 is heated by increasing the heat loss of the engine 10. Further, an increase in the intake air will result in an increase in the amount of injected fuel. Thus, the exhaust gas heating control will adversely affect the fuel efficiency of the engine 10. Nevertheless, the catalyst device 19 purifies only a subtle amount of exhaust gas until the first process ends and the catalyst in the first region R1 is activated. In contrast, the second process is performed when the catalyst in the first region R1 has been activated, that is, when the catalyst device 19 is able to purify the exhaust gas to a certain extent. Thus, more time can be used for the second process that heats the second region R2 than the first process that heats the first region R1. Accordingly, instead of executing the exhaust gas heating control throughout the period during which catalyst accelerated activation control is executed, it is desirable that the exhaust gas heating control be executed so that the amount of heat of exhaust gas is less increased in the second process than the first process. Alternatively, it is desirable that the exhaust gas heating control be executed in only the first process and not in the second process.

Figure 6:
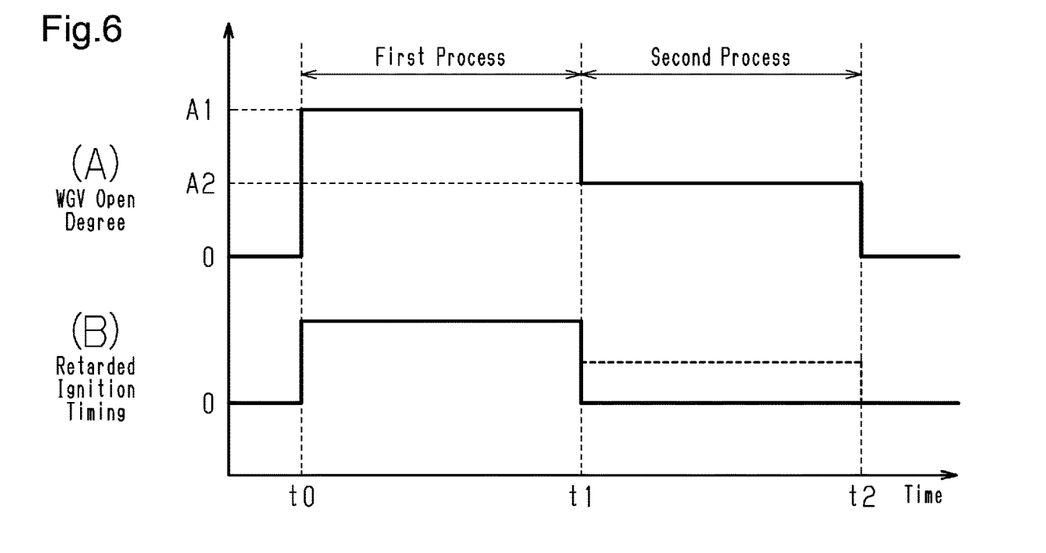
FIG. 6 is a time chart illustrating the catalyst accelerated activation control executed by an engine controller according to a second embodiment, where Section (A) of FIG. 6 shows the wastegate valve (WGV) open degree, and Section (B) of FIG. 6 shows the ignition timing.

FIG. 6 shows an example of how the catalyst accelerated activation control and the exhaust gas heating control are executed. In the example of FIG. 6, the exhaust gas heating control is executed by retarding the ignition timing Section (A) of FIG. 6 shows the WGV open degree, and Section (B) of FIG. 6 shows the retarded ignition timing. The retarded ignition timing indicates the length of time by which the ignition timing is retarded by the exhaust gas heating control. In FIG. 6, the catalyst accelerated activation control and the exhaust gas heating control are initiated at time to. The catalyst accelerated activation control performs the first process that maintains the WGV open degree at the first open degree A1 during the period from time t0 to time t1 and the second process that changes the WGV open degree to the second open degree A2 during the following period from time t1 to time t2. The retarded ignition timing is maintained at a specified positive value during the first process from time t0 to time t1 and set to 0 during the second process from time t1 to time t2. That is, in the example of FIG. 6, the exhaust gas heating control retards the ignition timing only during the first process.

The exhaust gas heating control is executed during the first process so that the catalyst device 19 starts exhaust gas purification more quickly. The exhaust gas heating control is not executed during the second process. Thus, the decrease in fuel efficiency the engine 10 resulting from execution of the exhaust gas heating control is limited. As shown by the chained line of Section (B) of FIG. 6, the exhaust gas heating control may also be executed during the second process by shortening length of time the ignition timing is retarded from the first process. This will have a similar advantage. If activation of the catalyst device 19 is given priority over fuel efficiency, the exhaust gas heating control may be executed during the second process so that the retarded ignition timing is the same as the first process.

Modified Examples of the Above Embodiments

The above-described embodiments may be modified as follows. The above-described embodiments and the following modifications can be combined as long as there is no technical contradiction.

First Open Degree A1 and Second Open Degree A2

In the above embodiment, the first open degree A1 is the maximum open degree. Instead, the first open degree A1 may be an intermediate open degree. In this case, the second open degree A2 is an intermediate open degree that is less than or greater than the first open degree A1.

Determination of Completion of First Process and Second Process

In the above embodiment, completion of the first process and the second process is determined from the time elapsed from when the process starts. The time required to activate or heat the catalyst in the first process and the second process varies in accordance with the catalyst temperature and the ambient temperature when the processes are initiated. Thus, the times during which the first process and the second process are performed may be varied in accordance with the engine coolant temperature THW and the intake air temperature THA when the engine 10 is started.

The amount of heat applied to the catalyst device 19 by exhaust gas is correlated with the flow rate of the exhaust gas entering the catalyst device 19. The flow rate of the exhaust gas is correlated with the intake air flow rate GA. Thus, the completion of the first process and the second process may be determined from an integrated value of the intake air flow rate GA from the start of the process.

Further, the completion of the first process and the second process may be determined from an estimated catalyst temperature of the first region R1 and the second region R2. The catalyst temperature of the first region R1 and the second region R2 can be estimated from the engine coolant temperature THW, the ambient temperature, the intake air flow rate GA, the ignition timing, and the like when the engine 10 is started. The catalyst temperature of the first region R1 and the second region R2 may be detected by a sensor, and the completion of the first process and the second process may be determined from the detected catalyst temperature.

Change in WGV Open Degree in Second Process

In the above embodiment, the second process maintains the WGV open degree at the second open degree A2. Instead, the second process may gradually change the WGV open degree from the first open degree A1 to a specified third open degree A3 that differs from the first open degree A1.

Figure 7:
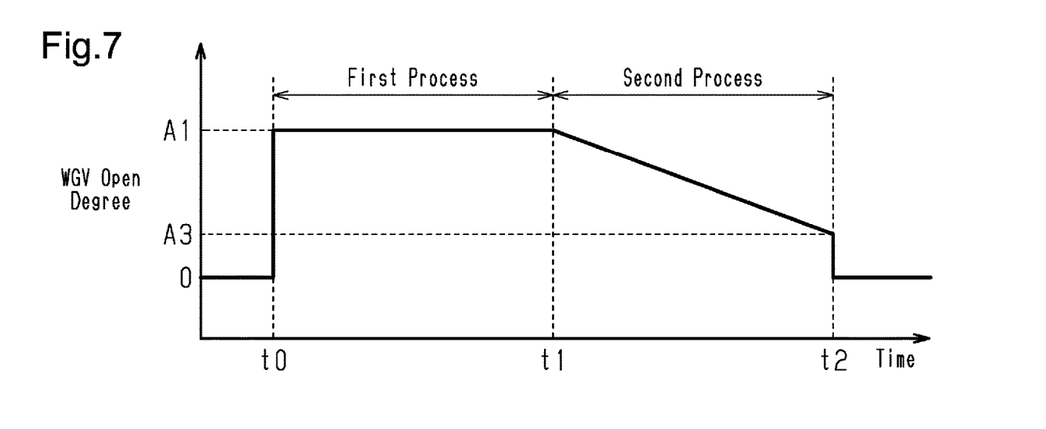
FIG. 7 is a time chart showing the WGV open degree when a modified example of the engine controller executes the catalyst accelerated activation control.

FIG. 7 shows the WGV open degree changed during the catalyst accelerated activation control. In FIG. 7, the catalyst accelerated activation control is initiated at time t0. The first process maintains the WGV open degree at the first open degree A1 during the period from time t0 to time t1. The second process is performed during the period from time t1 to time t2. From time t1 to time t2, the WGV open degree is gradually changed from the first open degree A1 to the third open degree A3. In this case, the second region R2 over which exhaust gas is blown in a concentrated manner is gradually shifted during the second process. This heats the catalyst over a wide range in the second process.

Figure 8:
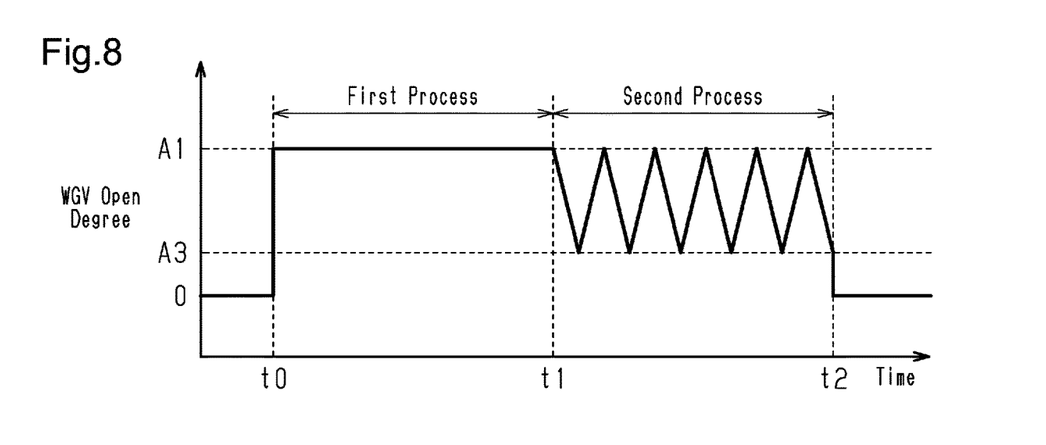
FIG. 8 is a time chart showing the WGV open degree when a further modified example of the engine controller executes the catalyst accelerated activation control.

The second process may repeatedly increase and decrease the open degree of the WGV 25 within a specified open degree range. FIG. 8 shows the WGV open degree changed when the catalyst accelerated activation control is executed. In FIG. 8, the first process is performed during the period from time t0 to time t1, and the second process is performed during the period from time t1 to time t2. In FIG. 8, during the second process, the open degree of the WGV 25 is repeatedly increased and decreased within the range of the first open degree A1 to the third open degree A3. This gradually shifts the second region R2 over which the exhaust gas is blown in a concentrated manner during the second process so that the catalyst is heated over a wide range.

In FIGS. 7 and 8, the third open degree A3 is an intermediate open degree. Instead, the third open degree A3 may be 0.

Engine Controller

The engine controller does not need to include the processor 31 and the memory 32 and execute software processing. For example, a dedicated hardware circuit such as ASIC may be provided that executes at least part of the software processes executed in the above-described embodiment. That is, the engine controller may be modified as long as it has any one of the following configurations (a) to (c). (a) A configuration including a processor that executes all of the above-described processes according to programs and a program storage device such as ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software executing devices each including a processor and a program storage device and a plurality of dedicated hardware circuits may be provided. That is, the above processes may be executed by processing circuitry that includes at least one of a set of one or more software executing devices or a set of one or more dedicated hardware circuits. The program storage device, or computer readable media, includes any type of media that are accessible by general-purpose computers and dedicated computers.

Various changes in form and details may be made to the examples above without departing from the spirit and scope of the claims and their equivalents. The examples are for the sake of description only, and not for purposes of limitation.

Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An engine controller applied to an engine, wherein the engine includes a turbine arranged in an exhaust passage, a bypass passage branched from the exhaust passage at an upstream side of the turbine in the exhaust passage and joined with the exhaust passage at a downstream side of the turbine in the exhaust passage, a wastegate valve arranged at a joining location of the bypass passage and the exhaust passage, and a catalyst device for purifying exhaust gas arranged at a downstream side of the joining location in the exhaust passage, the engine controller being configured to execute a catalyst accelerated activation control that maintains the wastegate valve in an open state and accelerates activation of the catalyst device when the engine is started in a cold state, the engine controller comprising:

processing circuitry configured to execute the catalyst accelerated activation control by performing a first process that maintains an open degree of the wastegate valve at a specified first open degree and then performing a second process that changes the open degree of the wastegate valve to an open degree that differs from the first open degree.

2. The engine controller according to claim 1, wherein the second process maintains the open degree of the wastegate valve at a specified second open degree that differs from the first open degree.

3. The engine controller according to claim 1, wherein the second process gradually changes the open degree of the wastegate valve from the first open degree to a specified third open degree that differs from the first open degree.

4. The engine controller according to claim 1, wherein the second process repeatedly increases and decreases the open degree of the wastegate valve within a specified open degree range.

5. The engine controller according to claim 1, wherein the processing circuitry is configured to execute an exhaust gas heating control that increases an amount of heat of exhaust gas entering the catalyst device when the catalyst accelerated activation control is being executed.

6. The engine controller according to claim 5, wherein the processing circuitry is configured to execute the exhaust gas heating control so that the amount of heat of the exhaust gas is less increased in the second process than the first process.

7. The engine controller according to claim 5, wherein the processing circuitry is configured to execute the exhaust gas heating control only when the first process is being performed.

8. A method for controlling an engine, wherein the engine includes a wastegate valve configured to open a bypass passage that bypasses a turbine arranged in an exhaust passage, and a catalyst device for purifying exhaust gas arranged at a downstream side of the wastegate valve in the exhaust passage, the method comprising:

performing a first process that maintains an open degree of the wastegate valve at a specified first open degree so that exhaust gas is blown over a first region in the catalyst device when the engine is started in a cold state; and performing a second process that maintains the open degree of the wastegate valve at a second open degree that differs from the first open degree so that the exhaust gas is blown over a second region in the catalyst device that differs from the first region after the first process is performed.

* * * * *